United States Patent [19]

Bishop et al.

[11] Patent Number: 4,860,414
[45] Date of Patent: Aug. 29, 1989

[54] INDEXING AND TRANSPORTING MECHANISM

[75] Inventors: Arthur E. Bishop, Northwood; David W. Scott, Ruse, both of Australia

[73] Assignee: Bishop & Associates, A. E., Union Lake, Mich.

[21] Appl. No.: 145,329

[22] Filed: Jan. 19, 1988

[30] Foreign Application Priority Data

Jan. 29, 1987 [AU] Australia ................ PI0089

[51] Int. Cl.4 .............. B23P 23/00; B23B 29/00
[52] U.S. Cl. ........................ 29/38 C; 29/563; 409/198; 409/221; 74/813 R; 74/818
[58] Field of Search ............ 29/38 C, 38 R, 563; 409/197, 198, 221, 222, 223; 74/813 R, 818, 813 L, 820, 665 A

[56] References Cited
U.S. PATENT DOCUMENTS 2,318,619  5/1943  Nuel ........................... 29/38 C
2,618,904  11/1952 Gartner ....................... 29/38 R
3,324,742  6/1967  Kavanaugh ................... 74/813 R Primary Examiner—Bruce Y. Arnold
Assistant Examiner—R. D. Shafer
Attorney, Agent, or Firm—Hill, Van Santen, Steadman & Simpson

[57] ABSTRACT

An indexing and transporting mechanism having a plurality of work-holding spindles spaced around a carousel, the carousel being journaled on a machine frame provided with work-performing stations and being indexable to carry the spindles sequentially from station to station, the work-holding spindles being arranged to be indexed through one complete revolution at some stations and not at others by a work-holding spindle orienting and indexing mechanism which consists of a track carried by the machine frame concentric with the carousel journals, projections extending from the work-holding spindles which engage the track to prevent rotation of the work-holding spindles relative to the carousel over part of a revolution of the carousel, the track being interrupted at the stations where indexing occurs, each interrupted portion of the track being mounted on indexable spindles carried by the machine frame, each interrupted portion of the track being arranged to be indexed through one complete revolution while the work-holding spindle is at the station.

2 Claims, 4 Drawing Sheets

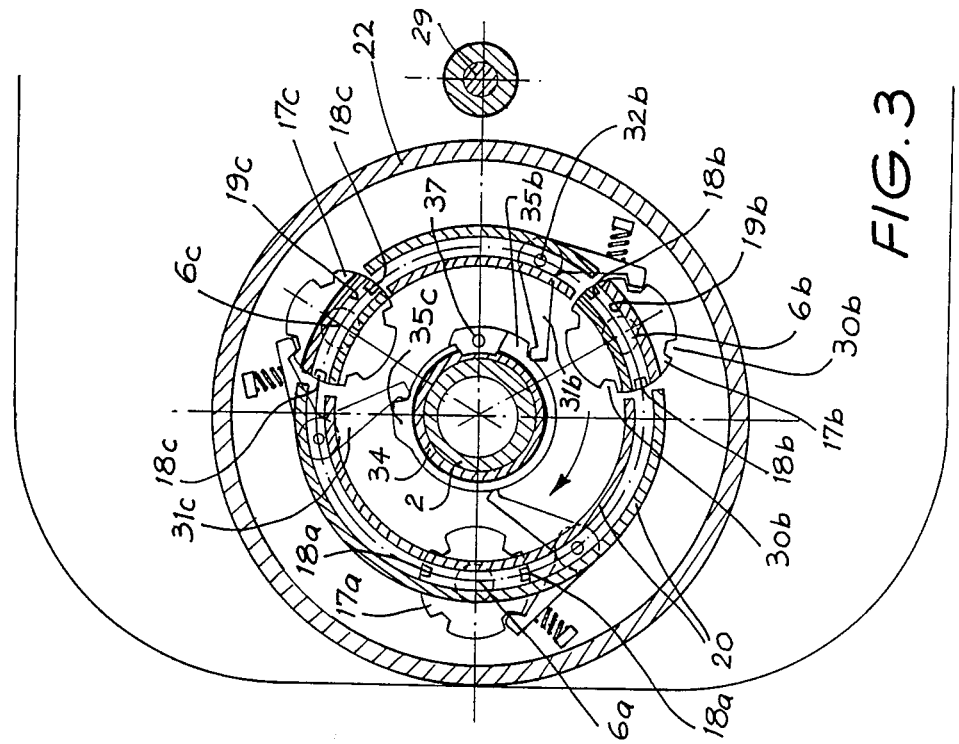
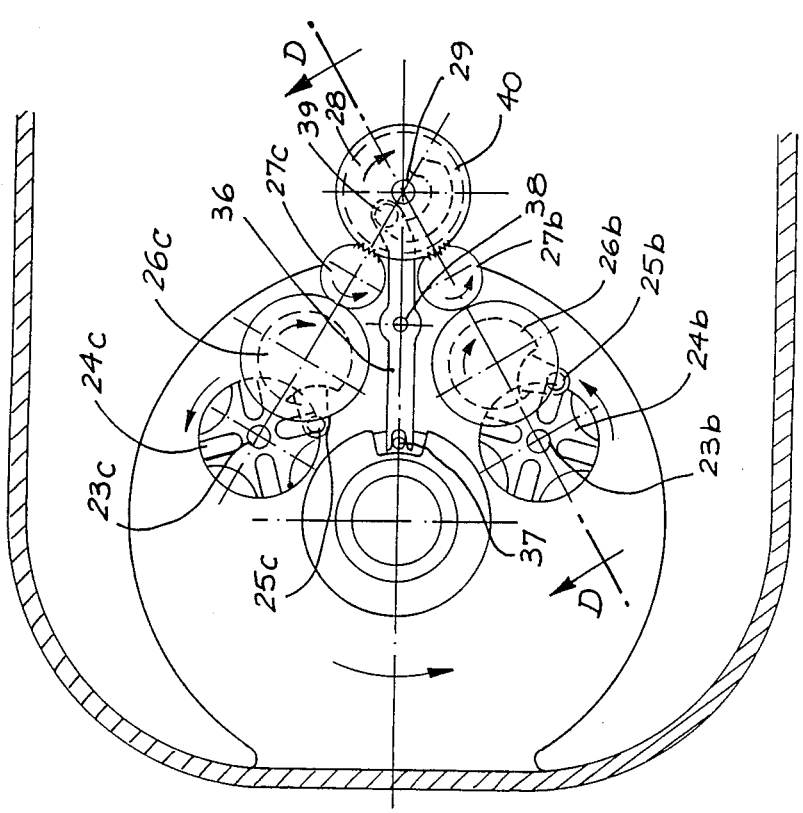

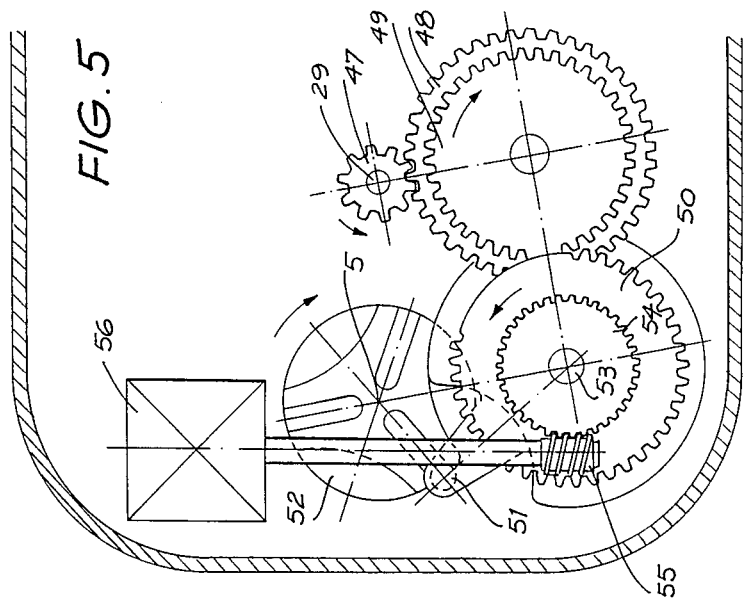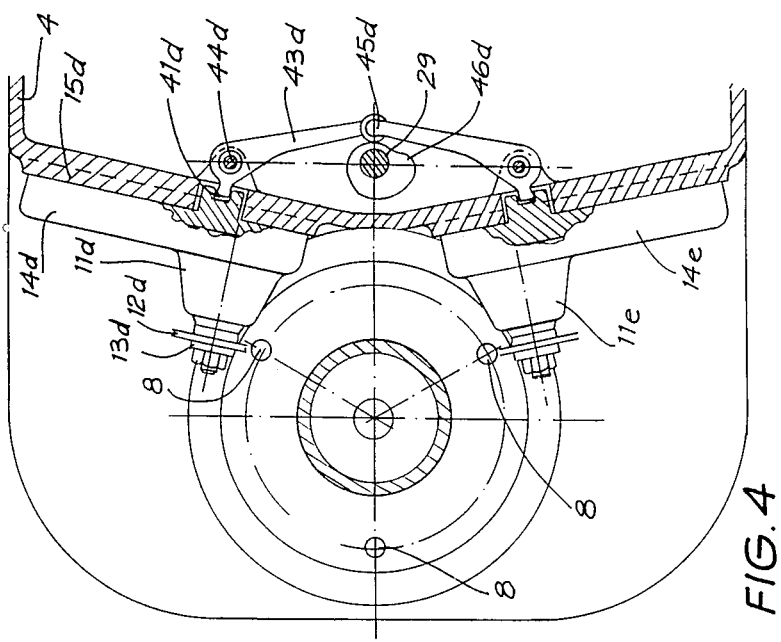

INDEXING AND TRANSPORTING MECHANISM

The present invention relates to mechanisms of the kind in which a carousel rotatable about a central axis and housing a plurality of spindles, is rotated to transport the spindles to a series of stations. While the spindles are stopped at some stations, they are indexed through a series of angular positions, whereas at the other stations they remain stationary.

A preferred form of the invention is described as applied to a milling machine for manufacturing hydraulic valve components in which the carousel is journaled for rotation about a vertical axis in the main frame of the machine, and carries three spindles sequentially to three stations, two stations being provided with milling spindles supported on slideways carried by the main frame of the machine.

Milling cutters carried by the milling spindles are plunged radially into the valve components to machine longitudinal grooves therein at four places spaced circumferentially around the valve, the grooves made by the milling spindle at the first station being different from those made at the second stations, and intermediately spaced therebetween.

At the third station the spindles do not index, but a collet chuck which holds the valve component is opened (by means not shown) for removal of the finished part and insertion of a new part.

The angular spacing of the longitudinal grooves must be very precise, and it is a feature on the machine that precise, backlash-free indexing is provided. Furthermore, the mechanism is capable of operating at high speeds so that a part is completed every few seconds.

It was the requirement of achieving both high precision and high operating speed that required the development of a novel indexing and transporting mechanism.

The present invention consists in an indexing and transporting mechanism comprising a plurality of work-holding spindles spaced around a carousel, the carousel being journaled on a machine frame provided with work performing stations and being indexable to carry the spindles sequentially from station to station, means for indexing the work-holding spindles through one complete revolution at some stations and not at others, a work-holding spindle orienting and indexing mechanism comprising a track carried by the machine frame concentric with the carousel journals, projecting means extending from the work-holding spindles engaging the track to prevent rotation of the work-holding spindles relative to the carousel over part of a revolution of the carousel, the track being interrupted at the stations where indexing occurs, each interrupted portion of the track being mounted on indexable spindles carried by the machine frame and means indexing each interrupted portion of the track through one complete revolution while the work-holding spindle is at the station.

It is preferred that the projecting means are in the form of prongs that engage the track with clearance providing an approximate indexed position for the spindles, the spindles being provided with precise index plates engaged by latches carried by the carousel so as to provide precise final positioning of the spindles at each indexed position over and above the approximate positioning provided by the prongs.

In order that the invention may be better understood a preferred form thereof is hereinafter described, by way of example, with reference to the accompanying drawings in which:

FIG. 2 is a plan view of the machine with a top cover removed;

FIG. 3 is a section on line AA of FIG. 1;

FIG. 4 is a section on line BB of FIG. 1;

FIG. 5 is a view in direction E of FIG. 1; and

Figure 1:
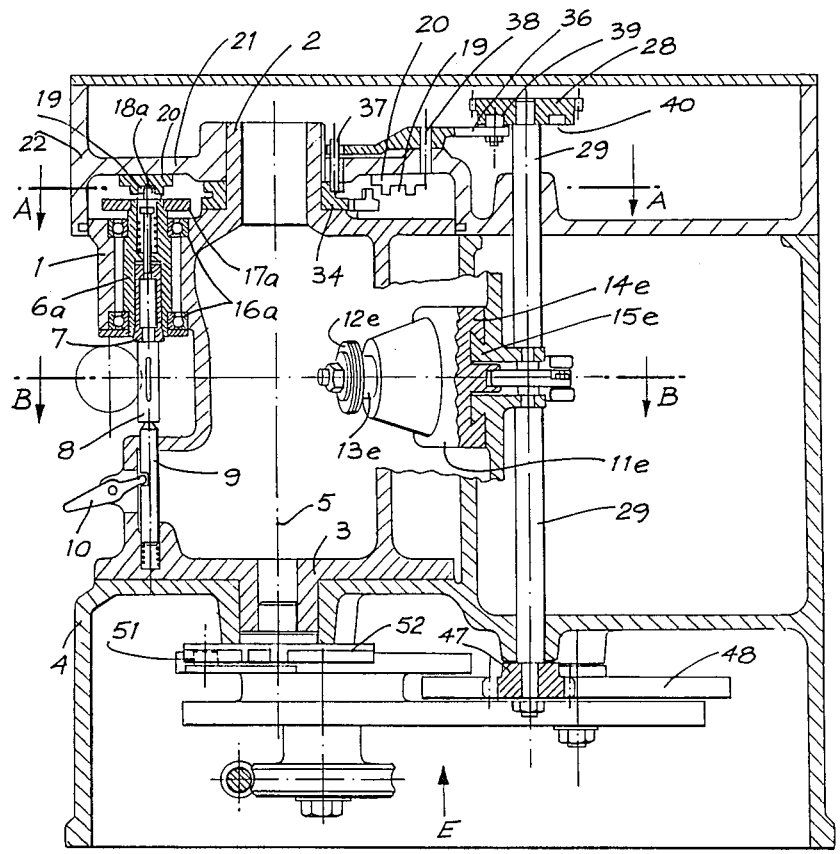
FIG. 1 is a cross-sectional elevation of machine according to the invention through the carousel axis.

In FIG. 1, carousel 1 is provided with upper and lower axle extensions 2 and 3 journaled in machine frame 4 about axis 5.

The carousel has three work-holding spindles 6a, 6b and 6c spaced equally around its upper end, each of which is provided with collet 7 which clamps the upper end of valve component 8, the lower end of which is supported by retractable centre 9.

The spindle 6a which appears in section in FIG. 1 is at the loading station. A suitable retraction lever 10 is provided to move the centre into and out of engagement to allow the removal and loading of components at the loading station. Carousel 1 is broken in the right hand side of this view to expose milling station 11e, one of the two milling stations 11d and 11e, provided with milling cutter 12e secured to milling spindle 13e carried in bearings on slide 14e supported on slideway 15e which is mounted on frame 4. Similar arrangements are provided in respect of milling station 11d. The motor drive to the milling cutters is not shown.

Spindle 6a is journaled in carousel 1 by bearings 16a and carries, at its upper end, index plate 17a which has, extending axially therefrom, two prongs 18a. These prongs loosely engage a circular track 19 formed in ring 20 which is secured to the underside of a plate or diaphragm 21 formed in housing 22 which is secured to frame 4.

Figure 6:
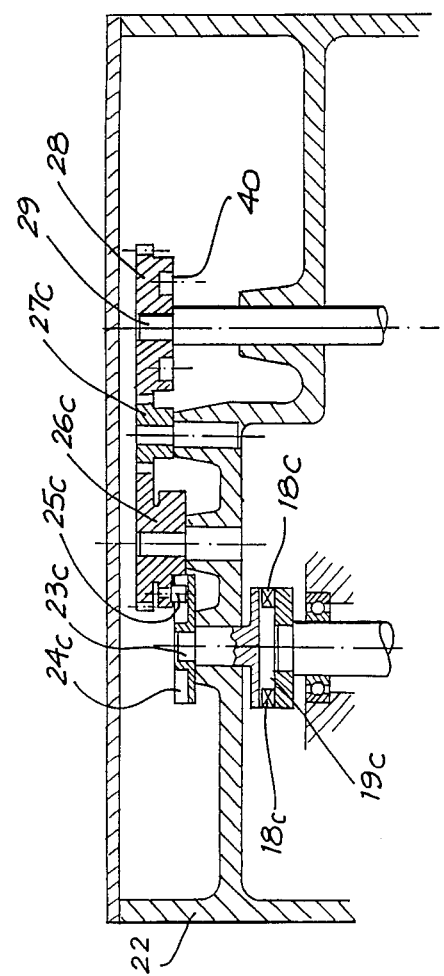
FIG. 6 is a section on line DD of FIG. 2.

Ring 20 (and thus track 19) is interrupted at two places (see FIGS. 3 and 6) corresponding to the positions of spindles 6b and 6c where track 19 is replaced by arcuate tracks 19b and 19c formed in the underside of the flanges of two indexable track-carrying spindles 23b and 23c journaled in housing 22.

Note that when carousel is stopped, the spindles 6b and 6c align with the corresponding axes of indexing spindles 23b and 23c. The prongs 18 extending from spindles 6 serve to maintain the spindlers in a field angular relationship to carousel 1 at all times except when their axes are aligned with those of indexable spindles 23b and 23c where they are co-ordinated in rotation therewith during one complete revolution comprising four intermediate indexes each of 90°.

The 90° indexing of spindles 23b and 23c is effected by respective four-lobe geneva wheels 24b and 24c and geneva drive pins 25b and 25c incorporated in gears 26b and 26c, which are themselves, driven through idlers 27b and 27c from gear 28 mounted on drive shaft 29.

Thus one revolution of shaft 29 causes geneva drive pins 25 to index spindles 23 and 6 through 90°. Now index plates 17 each have provided in their peripheries four radial notches typically as shown at 30b in respect of index plate 17b (FIG. 3). These notches are engaged by latch finger 31b pivoted at 32b in carousel 1 and actuated by ring cam 34 journaled on carousel axle extension 2. One latch is provided for each spindle 6 and serves to precisely locate the spindle over and above the rough, slack location provided by prongs 18.

From FIG. 3 it will be seen that a slight clockwise rotation of ring cam 34 which has on its periphery two lobes 35b and 35c which will cause levers 31b and 31c to lift and disengage their fingers from respective notches 30 to allow index wheels 17b and 17c to rotate. However, as there is no lobe on ring cam 34 at the loading station corresponding to the spindle designated 6a, this spindle remains latched. Thus indexing of spindles 6b and 6c will occur at the respective milling stations 11d and 11e, but not at the loading station.

The slight clockwise rotation of ring cam 34 is caused by the action of forked lever 36 (FIG. 2) which engages a pin 37 extending axially through a slot provided in diaphragm 21 and has, at its extended end (FIGS. 1 and 2) cam follower 39 engaged in a cam track 40 formed in the underside of gear 28.

The respective parts of the machine are shown at the instant the indexing of spindles 6 is about to commence and, for this reason, ring cam 34 is about to be driven clockwise by cam track 40 through lever 36. Shortly thereafter geneva pins 25b and 25c will enter the respective slots of geneva wheels 24b and 24c and cause spindles 23 and 6 to rotate 90°, after which latches 31 will re-engage their respective notches in index plates 17b and 17c.

After each cycle of indexing four times at stations 6b and 6c, the carousel then indexes one third of a revolution so that the spindle designated here as 6b will occupy the position of the spindle shown at 6c. During this movement latches 31 will again be withdrawn by their passage over cam lobes 35b and 35c of cam ring 34. However, spindles 6 cannot rotate while unlatched due to the engagement of prongs 18 with track 19 (FIG. 1) as might occur due to angular acceleration during indexing if such positive guiding were not provided. Shaft 29 serves to co-ordinate the spindle drive mechanism just described with the other functions of the machine, including the infeeding of the milling stations 11d and 11e and the indexing of carousel 1 in a manner now to be described.

Referring to FIG. 4, slide 14d has a slot 41d formed therein which engages lever 43d pivoted on pin 44d which is supported by frame 4. The other end of lever 43d is provided with a follower 45d engaging cam 46d mounted on the shaft 29. A similar arrangement is provided in respect of milling station 11e.

In the instant shown in FIG. 4, cam 46d has fully retracted slide 14d in preparation for the indexing of spindle 6c.

FIG. 5 shows the mechanism which co-ordinates the indexing motions of spindles 23b and 23c and infeed motions of milling stations 11d and 11e resulting from rotation of shaft 29 with the indexing motions of the carousel 1. Shaft 29 must rotate through 4 revolutions and then dwell while carousel 1 rotates in order to avoid the indexing and infeed motions occurring during rotation of the carousel. To this end, shaft 29 is provided, at its lower extremity, with gear 47 engaging gear 48 at a ratio 1:4, that is gear 48 has four times the number of teeth as 47.

Gear 48 is attached to driven intermittent gear 49 which is driven by intermittent driver gear 50. The numbers of teeth on both intermittent gears 49 and 50 is the same, but the driver gear 49 dwells for approximately 1/5 of a revolution of intermittent driver gear 50, which rotates at a constant speed. During the dwell period geneva pin 51, which is secured to driver intermittent gear 50, engages slots of geneva plate 52 which is secured to the lower axle extension 3 of carousel 1.

At the instant shown in FIG. 5, the indexing of the carousel has just been completed and intermittent gear 50 is about to engage intermittent gear 49 to cause it to make one full revolution, so rotating shaft 29 through 4 complete revolutions.

Intermittent gear 49 is carried on shaft 53 to which is secured worm wheel 54 which is driven by worm 55 mounted on the shaft of drive motor 56.

We claim:

1. An indexing and transporting mechanism comprising a plurality of work-holding spindles spaced around a carousel, and journaled therein, the carousel being journaled for rotation about its longitudinal axis on a machine frame provided with work performing stations, means for indexing the carousel about its axis to carry the spindles sequentially from station to station, means for indexing the work-holding spindles through one complete revolution at some stations and not at others, a work-holding spindle orienting and indexing mechanism comprising an annular track carried by the machine frame concentric with the carousel axis, projecting means extending from the work-holding spindles engaging the track to prevent rotation of the work-holding spindles relative to the carousel over part of a revolution of the carousel, the track being interrupted at both sides of the stations where indexing occurs, there being an interrupted portion at each of the last named stations each interrupted portion of the track being mounted on track-carrying spindles carried by the machine frame and means for indexing each interrupted portion of the track on its track-carrying spindle through one complete revolution while the work-holding spindle is at the station.

2. An indexing and transporting mechanism as claimed in claim 1, wherein the projection means are in the form of prongs that engage the interrupted portion of the track with clearance providing an approximate indexed position for the work-holding spindles, the work-holding spindles being provided with precise index plates engaged by latches carried by the carousel so as to provide precise final positioning of the spindles relative to the carousel at each indexed position over and above the approximate positioning provided by the prongs.

* * * * *